United States Patent [19]
Brake et al.

[11] Patent Number: 5,275,131
[45] Date of Patent: Jan. 4, 1994

[54] MALE ONLY GRILL FOR POULTRY FEEDING

[75] Inventors: John T. Brake, Raleigh, N.C.; Talgat Khamidullin; Ludmila Samnilova, both of Moscow Region, all of U.S.S.R.

[73] Assignee: North Carolina State University, Raleigh, N.C.

[21] Appl. No.: 820,349

[22] Filed: Jan. 14, 1992

[51] Int. Cl.⁵ .................................... A01K 39/014
[52] U.S. Cl. .................................... 119/63; 119/52.4
[58] Field of Search ............... 119/52.3, 52.4, 57.9, 119/61, 63

[56] References Cited

U.S. PATENT DOCUMENTS

| | | | |
|---|---|---|---|
| 582,410 | 5/1897 | Young | 119/52.4 |
| 920,381 | 5/1909 | O'Connell | 119/61 |
| 1,525,561 | 2/1925 | Baird | 119/61 |
| 1,525,562 | 2/1925 | Baird | 119/61 |
| 5,016,573 | 5/1991 | Power | 119/57.9 |

FOREIGN PATENT DOCUMENTS

| | | | |
|---|---|---|---|
| 4734125 | 9/1989 | U.S.S.R. | |
| 749451 | 5/1956 | United Kingdom | 119/63 |
| 2236468 | 4/1991 | United Kingdom | 119/57.9 |

Primary Examiner—Robert P. Swiatek
Attorney, Agent, or Firm—Bell, Seltzer, Park & Gibson

[57] ABSTRACT

A male only grill and poultry feeder combination. A first barrier is connected to the feeder and extends radially outward therefrom for holding birds in a predetermined spaced relation from the feeder to restrain female birds from the feeder. A second barrier is connected to the feeder and positioned above the first barrier for preventing female birds from reaching the feeder by standing on the first barrier. A third barrier is connected to the feeder and spaced laterally outward from the feeder and is positioned between the first and second barrier for preventing female birds from reaching the feeder by forcing their chest portions between the first and second barriers.

12 Claims, 3 Drawing Sheets

MALE ONLY GRILL FOR POULTRY FEEDING

FIELD OF THE INVENTION

The present invention relates to poultry feeders in general, and particularly, this invention relates to a device for excluding female birds from a poultry feeder while permitting male birds to feed therefrom.

BACKGROUND OF THE INVENTION

Controlled feeding of broiler breeder flocks during the egg laying period is necessary to ensure that the birds are maintained at a body weight that provides optimum egg production, fertility and hatchability. Continuous unrestrained feeding of birds may result in excessive, unhealthy weight gains for the birds, resulting in damage to the feet and legs and reproductive dysfunction. Because the feeding requirements for optimum body weight control are different for male and female birds, the birds should be fed separately, on different feed schedules.

Presently, three methods are employed to accomplish sex-separate feeding in broiler-breeder flocks. Males generally have slightly wider heads ($\geq 43$ mm) than do females ($\geq 20$ mm). Since the eyes are located on the side of the head, the male is irritated when he inserts his head into a female only grill (FOG), which has a horizontal spacing between the vertical bars of 41–43 mm. Because some male broiler breeder lines have narrow heads ($\leq 41$ mm), a horizontal bar can be placed across the top of the FOG to create a vertical space of 60–70 mm. This eliminates many males from the feeder because the head of the typical male is considerably longer in the vertical dimension than the head of the typical female.

Non-dubbed males are easily excluded by FOG grills with horizontal bars. Females are excluded from male feeders by raising the male feeder height while leaving the female feeder, equipped with a FOG, low. A problem with this approach is that females are often observed to jump and reach into a male feeder successfully. As a result, females may take in more than, and males may take in less than, their optimum allocation of feed. Presently, there is no means available to exclude females from male feeders as effectively as males can be excluded from female feeders.

In view of the foregoing, an object of the present invention is to provide a means for excluding female birds from a male poultry feeder.

A second object of the present invention is to provide a male-only poultry feeder that does not unduly hinder or constrain the male birds themselves from feeding.

A third object of the present invention is to provide a male-only poultry feeder that can be conveniently adapted to existing poultry feeding equipment.

SUMMARY OF THE INVENTION

A male only grill and poultry feeder combination includes a poultry feeder and a first barrier connected to the feeder and extending radially outward therefrom for holding birds in a predetermined spaced relation from the feeder to restrain female birds from the feeder. A second barrier is connected to the feeder and positioned above the first barrier for preventing female birds from reaching the feeder by standing on the first barrier. A third barrier is connected to the feeder and is spaced laterally outward from the feeder. The third barrier is positioned between the first and second barriers for preventing female birds from reaching the feeder by forcing their chest portion between the first and second barriers.

In a preferred embodiment, the male only grill and poultry feeder combination comprises an enclosed chamber having a top cover, a side wall and a bottom wall portion. A poultry feeder is connected to the enclosed chamber bottom portion and the enclosed chamber side wall is spaced apart from the poultry feeder from about two to six inches. At least one opening is formed in the enclosed chamber side wall. The vertical distance of the opening is about three inches or greater. The horizontal width of the opening is about two inches. The enclosed chamber can be formed from upper and lower grills and a grill skirt.

In another embodiment, the first barrier comprises a bottom portion connected to the feeder and extends radially outward therefrom. The bottom portion has an outer edge portion positioned a distance from about 2 to 6 inches from the poultry feeder to restrain female birds from the feeder. The second barrier comprises a top cover connected to the feeder and positioned above the bottom portion and spaced apart therefrom for preventing female birds from reaching the feeder by standing on the bottom portion. The top cover has a lower edge portion that is spaced apart from the bottom portion outer edge a distance of at least about 3 inches or greater. The lower edge portion and the outer edge portion define a feed opening. In that preferred embodiment, the third barrier member comprises a skirt connected to the top cover lower edge portion. The skirt extends downward and overlies the feeding opening. The skirt has a lower edge portion. The lower edge portion and the bottom portion outer edge define horizontal entry opening of about two inches. Preferably, the barriers comprise bottom grills, top grills, and a skirt grill.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF THE PREFERRED EMBODIMENTS

Figure 1:
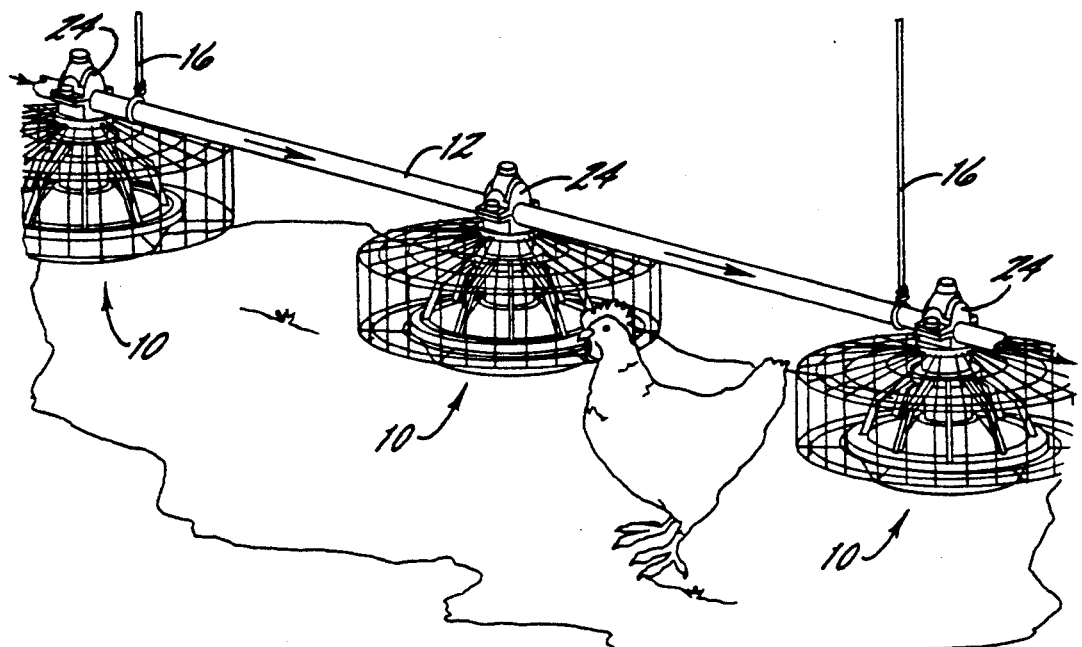
FIG. 1 is an isometric view of the male only grill and poultry feeder combination in accordance with one embodiment of the present invention in which a plurality of the apparatus are joined to a header pipe, which moves feed to different locations in a poultry house.

Referring now to the drawings, and more particularly to FIG. 1, there is disclosed a plurality of male only grill and poultry feeders, illustrated generally at 10, connected to a header pipe. The header pipe 12 is a conventional feed header, which extends through a poultry house. The poultry feed is forced through the header pipe 12 by means of an auger or other conveyance and drops into the poultry feeder, indicated generally at 14, as shown in greater detail in FIG. 2. Guide wires 16 support the feed header for vertical movement within the poultry house. At feeding time, the guide wires 16 may be lowered, moving the poultry feeders 14 close to the poultry house floor to allow the male birds to gain access to the feed contained within the poultry feeder 14.

FIGS. 1-4 illustrate only one embodiment of the apparatus of the present invention. The apparatus is illustrated with one type of poultry feeder 14, found commercially on the market. The poultry feeder 14 includes a lower dish 20 having central feed core 22 and connection joint 24 mounting the poultry feeder to the header 12. Ribs 26 interconnect the central core with the dish 20. Feed is channeled through the central core 22 onto a conical baffle member 28 where it is distributed into the dish. The illustrated embodiment discloses a circular, pan-type feeder. However, a rectangular configured troughtype feeder may be used also.

In accordance with the illustrated embodiment of FIGS. 1-4, the male only feeding apparatus 10 includes an enclosure defined by grills. For purposes of illustration, the description of the invention will proceed with reference to first, second and third barrier means illustrated generally at 30, 32, 34. The apparatus 10 is designed to accommodate the larger reach of the male birds as compared with the limited reach of the female birds. First barrier means 30 is connected to the poultry feeder 14 for holding birds in a predetermined spaced relation from the feeder to restrain female birds from the feeder. In the illustrated embodiment, the first barrier comprises a bottom grill extending radially outward therefrom. The bottom grill 40 has an outer edge portion 42 positioned a distance of from about 2 to 6 inches from the poultry feeder 14 to restrain the female birds from the feeder.

Second barrier means 32 is connected to the poultry feeder 14 and is positioned above the first barrier 30 for preventing female birds from reaching the feeder by standing on the first barrier 30. As illustrated, the second barrier means 32 comprises a top grill cover 44 connected to the poultry feeder and positioned above the bottom grill and spaced apart therefrom for preventing female birds from reaching the poultry feeder by standing on the lower grill 40. The top grill 44 has a lower edge portion 46 that is spaced apart from the lower grill outer edge portion 42. The lower edge 42 and upper edge 46 of the grill are spaced a distance about 3 inches or greater and define the vertical distance of the feed opening.

Third barrier means 34 comprises a grill portion in the form of a skirt 50 connected to the top grill lower edge 46. The skirt 50 overlies the feeding opening. The skirt includes entry openings 52 having a horizontal opening distance of about two inches and a vertical distance of about three inches or greater.

Figure 3:
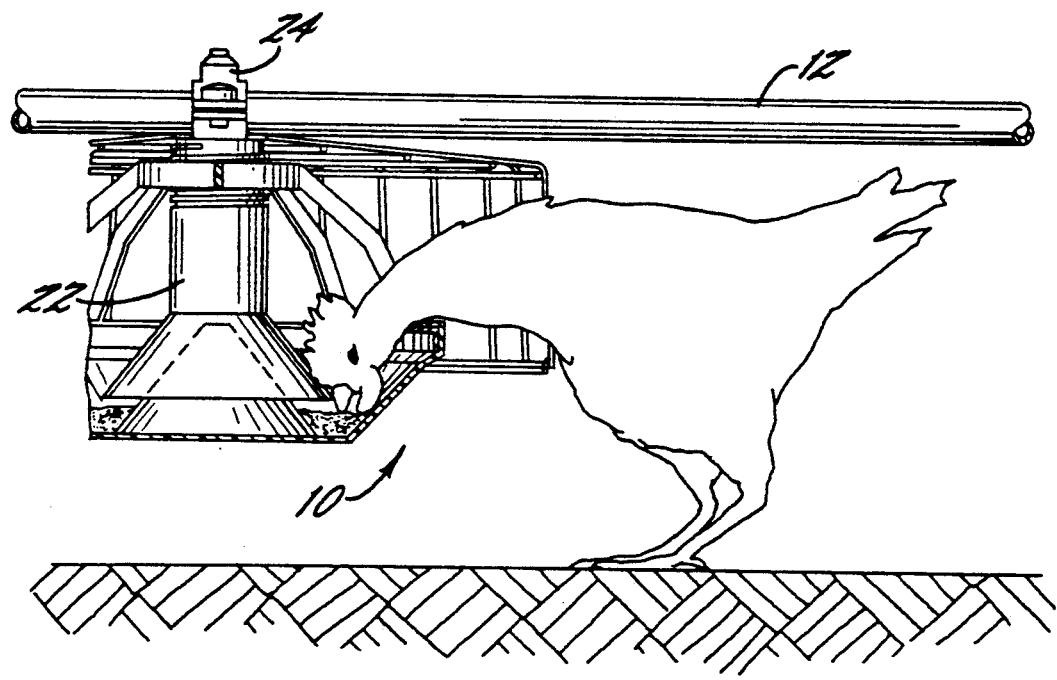
FIG. 3 is a side elevational view of the grill and poultry feeder combination in accordance with the embodiment shown in FIG. 1 and showing a male bird (rooster) feeding.
Figure 4:
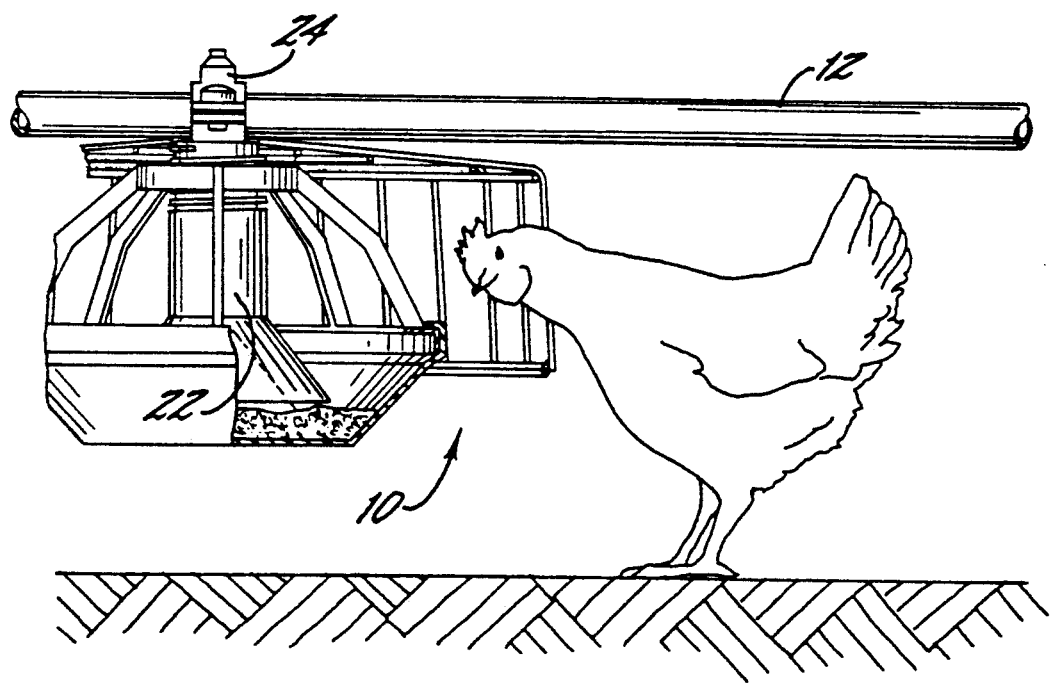
FIG. 4 is a side elevational view of the grill and poultry feeder combination similar to FIG. 3 and showing a female bird (hen) restricted from feeding.

The grills may be fabricated from stainless steel wire, galvanized wire, plastic, or other suitable material. The dimensions of the grills also may vary as long as the male birds can extend their neck into the poultry feeder and obtain feed, while female birds, limited in their reach, engage the barriers and cannot obtain feed (FIGS. 3 and 4).

The male only feeding apparatus 10 of the present invention also may be constructed to comprise an enclosed chamber having a top cover, a side wall, and a bottom portion to form an enclosure. In the illustrated embodiment of FIGS. 1-4, the grills may be considered as the top cover, sidewall and bottom portion. However, instead of being formed from grills, the structure may be more contained and shielded, having holes, baffles or other means allowing male, but not female birds to feed. Although this embodiment is not illustrated in detail, the example poultry feeder 14 may be connected to the enclosed chamber bottom portion. The enclosed chamber side walls are spaced apart from the poultry feeder from about two to six inches. At least one opening is formed in the enclosed chamber side wall. The horizontal opening distance is about two inches, and the vertical distance opening is about three inches or greater.

Figure 5:
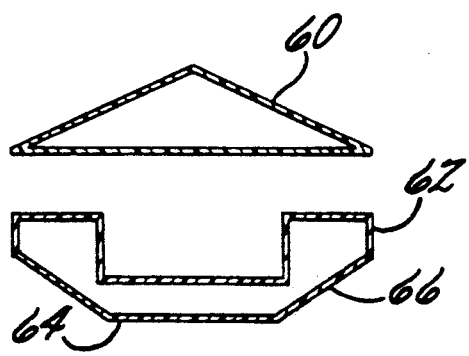
FIGS. 5–10 illustrate schematically different embodiments of the male only grill and poultry feeder combination in accordance with present invention.
Figure 6:
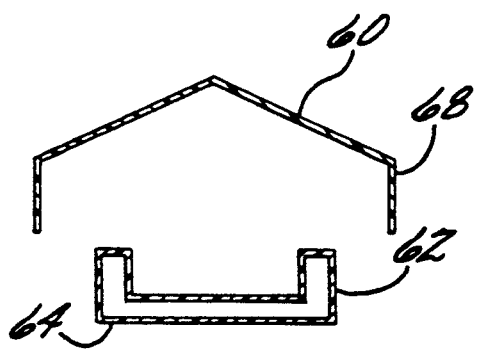
Figure 7:
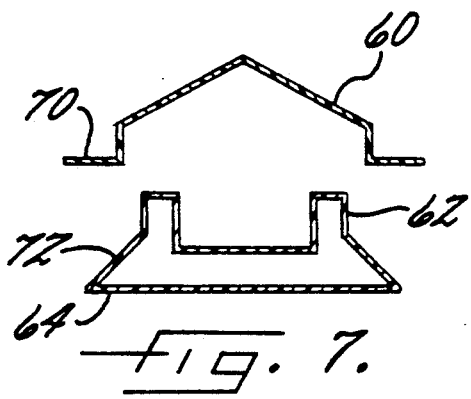
Figure 8:
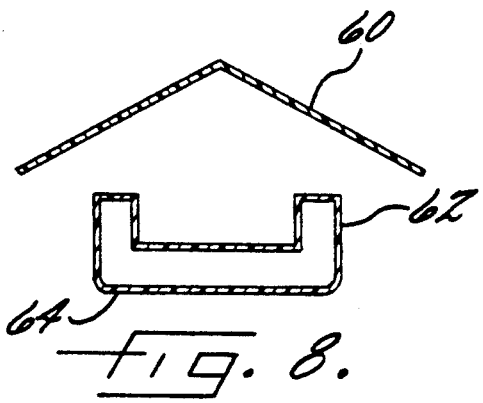
Figure 9:
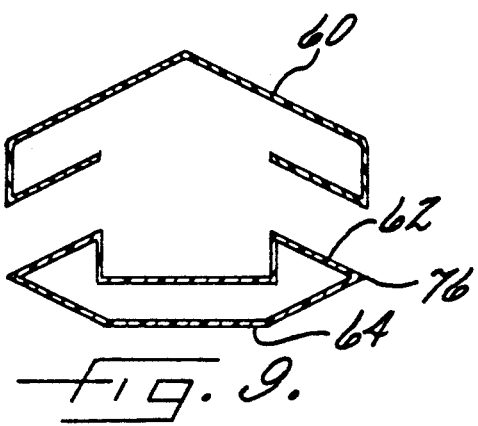
Figure 10:
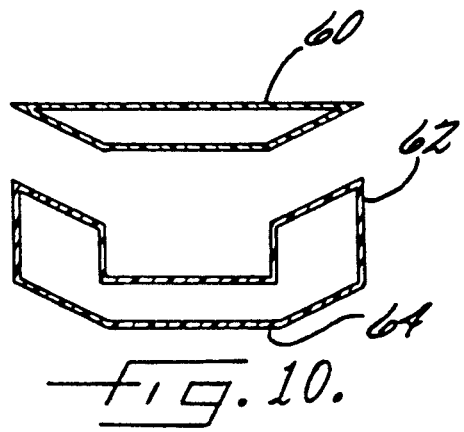

FIGS. 5-10 disclose other possible embodiments of the present invention. All the disclosed embodiments illustrate different structures that allow a male chicken to reach the feeder and feed positioned therein, but prevent the hen from reaching therethrough. In the illustrated embodiments, the structures show top covers, sidewalls and bottom portions, 60, 62, 64; the side wall portion can be an open grill-type structure as illustrated in FIGS. 1-4 or a wall having at least one feeding opening. FIG. 5 illustrates one embodiment in which the bottom portion 64 includes an inclined wall 66 designed for preventing female hens from reaching upward and through the opening. The feed is positioned within the bottom portion of a trough or pan. In FIG. 6 the top cover 60 is conical and includes a downwardly extending side wall 68, which requires a male bird to stretch through the opening and into the poultry feeder. The sidewall 68 acts as a third barrier spaced laterally outward from the feeder and positioned between first and second barriers for preventing female birds from reaching the feeder by standing on the first barrier. In FIG. 7, the top cover 60 includes an outer flange 70 extending substantially horizontal therefrom for aiding in maintaining the female birds in a predetermined spaced relation from the feeder. An inclined wall surface 72 extends upward from the bottom portion 64. FIG. 8 discloses an embodiment similar to FIG. 7 in which the top cover 60 is conical. FIG. 9 is another embodiment in which the side wall 62 is constructed with a sharp point 76. FIG. 10 illustrates another embodiment in which the sidewall 62 is high making it difficult for female hens to reach over the wall.

Overall, male birds generally do not jump and eat. Males simply stretch. The female action of the neck and head can be likened to the action of the human arm and hand while "dunking" a basketball. Males do not exhibit this behavior. Both male and female birds, however, include the common locomotion system having the shoulder girdle, the humerus, and forearm.

Figure 2:
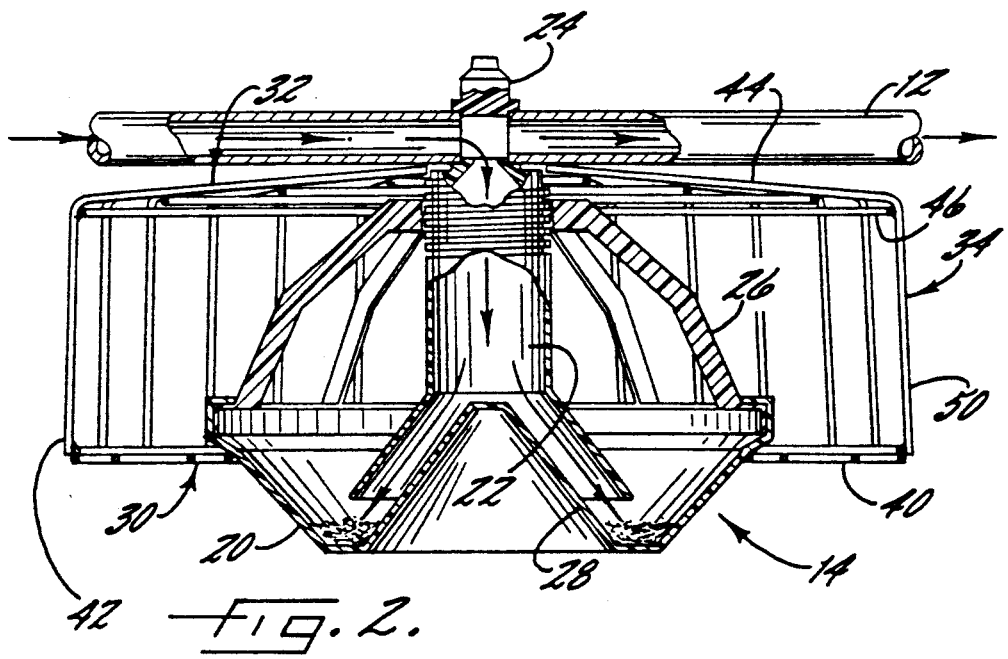
FIG. 2 is a sectional view of a grill and poultry feeder combination in accordance with the embodiment of the present invention shown in FIG. 1.

Separation of females from males at the male feeder has previously been accomplished by simply increasing the distance from the chicken house floor to the upper outer lip of the poultry feeder (FIG. 2). However, there are differences in feeding behavior between males and females. Generally, males do not jump and eat. Males simply stretch their bodies vertically. On the other hand, females are often observed to jump vertically and obtain feed by placing their head into the feeder while at the top of their jump. This can be likened to the action of the human arm and hand while "dunking" a basketball. Males rarely exhibit this behavior. This somewhat negates the effectiveness of raising the feeder. However, males do have longer necks than females. If the female jumping ability was not a factor, the longer neck of the male could be exploited to achieve sex separation.

The neck inserts into the chest cavity through an opening formed by the clavicle, coracoid bones, and scapula. Attached to the coracoids is the sternum and humerus. This collective structure makes up the anterior limit of the thorax or chest. It is covered by soft tissues, skin, and feathers. It is sufficiently larger than the diameter of the neck so as to limit the ability of a bird to reach horizontally through a hole and obtain feed. The neck ends at the articulation with the mandible or jaw.

Males also tend to be taller than females so as to place the point of insertion of the neck into the chest at a greater vertical distance from the floor than that of the female. To confirm these observations, 10 randomly selected 17, 39, and 60 week old broiler breeders of each sex were individually measured for length of neck (NL) and distance from level floor to insertion of neck into chest (CH). These dimensions are shown schematically in FIGS. 3 and 4.

In most birds, a bony plate, the keel projects from the midline, serving as one important part of the origin of the flight muscles.

The present invention is explained in greater detail in the following non-limiting examples.

EXAMPLE 1

Physical dimensions of broiler breeders. Ten randomly selected 17, 39, and 60 week old broiler breeders of each sex were individually measured for length of neck (NL) and distance from level floor to insertion of neck into chest (CH).

On an overall basis, males exhibited significantly greater body dimensions when compared to females (Table 1). The chest height, neck length, and combined distance was consistently greater for males. However, there was a significant interaction of sex with age for neck length and combined distance. This was due to a slightly greater neck length for males and females at 39 wk of age when compared to 17 and 60 wk old birds. This suggests some slight flock to flock variation which is probably influenced by growing programs which determine skeletal dimensions (unpublished observations). It is important to note that the shortest male neck length was greater than the longest female neck length, on average. This difference appeared to increase with age. Although not measured, the mandible of males was observed to be longer than the mandible of females. This would effectively increase the total male distance advantage.

TABLE 1

| Sex | Physical Dimensions of Broiler Breeders (Exp. 1) | | | |
|---|---|---|---|---|
| | 17 | 39 | 60 | $\bar{X}$ |
| | inches (cm) | | | |
| Male | | | | |
| Chest Height | 11.1[a] | 12.8 | 12.9 | 12.3[a] |
| | (28.2) | (32.5) | (32.8) | (31.2) |
| Neck Length | 7.6 | 8.4 | 8.1 | 8.0[a] |
| | (19.3) | (21.3) | (20.6) | (20.3) |
| Combined Distance | 18.7 | 21.2 | 21.0 | 20.3[a] |

TABLE 1-continued

| Sex | Physical Dimensions of Broiler Breeders (Exp. 1) | | | |
|---|---|---|---|---|
| | 17 | 39 | 60 | $\bar{X}$ |
| | inches (cm) | | | |
| | (47.5) | (53.8) | (53.3) | (51.6) |
| Female | | | | |
| Chest Height | 9.3 | 9.0 | 9.4 | 9.2[b] |
| | (23.6) | (22.9) | (23.9) | (23.4) |
| Neck Length | 6.0 | 6.9 | 6.0 | 6.3[b] |
| | (15.2) | (17.5) | (15.2) | (16.0) |
| Combined Distance | 15.3 | 15.8 | 15.4 | 15.5[b] |
| | (38.9) | (40.1) | (39.1) | (39.4) |
| Sex Combined | | | | |
| Chest Height | 10.2[b] | 10.9[a] | 11.1[a] | |
| | (25.9) | (27.7) | (28.2) | |
| Neck Length | 6.8[b] | 7.6[a] | 7.1[b] | |
| | (17.3) | (19.3) | (18.0) | |
| Combined Distance | 17.0[b] | 18.5[a] | 18.2[a] | |
| | (43.2) | (47.0) | (46.2) | |

[a,b]Main effect means which possess different superscripts differ significantly (P ≦ .001). There was a significant interaction of sex and age for neck length (P ≦ .001) and for combined distance (P ≦ .01).
[1]Each interaction represents the average of 10 birds. The dimensions are in inches and the metric equivalent in centimeters is shown in parentheses.

EXAMPLE 2

Normal feed consumption pattern. Three males or 3 females were placed in each of 10 pens per sex. Each pen was supplied with 1 hanging tube feeder possessing a 1 inch lip (Kuhl Model DH-4 feeder with DH-7 cylinder and P-9 hen pan. Kuhl Corporation, Flemington, NJ, 08822). The feeder was anchored in a position with guide wires such that the feeder could not swing. This insured that the feeder pan remained level. One pound (454 grams) of feed was placed in each feeder at Time 0. At 15 (Trial 2 only), 30, 60, 90, and 1440 minutes after placing the feed in the feeder, the complete unit was weighed to determine the percentage feed remaining. This was repeated in two trials and the data were combined.

Males consumed feed significantly faster than females (Table 2). This was evident as early as 15 minutes after feeding. This was not unexpected due to the greater body mass and digestive capacity of the larger males. The relative feed consumption time would probably be similar if adjusted to the same body weight. However, this would not reflect prevailing conditions in commercial practice.

TABLE 2

| Sex | Normal Feed Consumption Pattern of Broiler Breeders Expressed as Percent of Initial Feed Remaining at a Given Time (Exp. 2) | | | | | |
|---|---|---|---|---|---|---|
| | Minutes | | | | | |
| | 0 | 15 | 30 | 60 | 90 | 1440 |
| | % of initial feed remaining | | | | | |
| Female | 100[a] | 73.5[a] | 60.2[a] | 40.6[a] | 26.6[a] | 3.1[a] |
| | | (10) | (20) | (20) | (20) | (20) |
| Male | 100[a] | 54.9[b] | 37.2[b] | 16.5[b] | 9.1[b] | 1.8[a] |
| | | (10) | (20) | (20) | (20) | (20) |

[a,b]Means for number of replicate pens of three birds shown in parentheses which possess different superscripts differ significantly (P ≦ .0001).

EXAMPLE 3

Effect of feeder height alone. Standard unmodified hanging tube feeders were secured to prevent swinging. Broiler breeder males and females, 26, and 69 wk of age, were given access to the unmodified feeders at heights of 20, 21, 22, or 23 inches. These distances were based on the data of Experiment 1. Each height was tested with three pens of 3 males or females within a period of 1 wk. Birds were allowed access to the feeders for 30 minutes each day.

These effects are shown in Table 3. Males consumed feed faster than females and the male advantage became more pronounced with height. Increased height alone decreased feed consumption rate for both sexes. Older birds consumed feed more slowly but old males were less affected by height than young males as they generally consumed feed more slowly. At the extended heights, the males were observed to stretch for the feed, while the females were observed to jump and obtain feed regularly. Some females were more successful than others. Some females were observed to attempt perching on the lip.

TABLE 3

Effect of Feeder Height Alone on Feed Consumption Time (Exp. 3)

| Age | Sex | N | Height (inches) | | | | $\bar{X}$ |
|---|---|---|---|---|---|---|---|
| | | | 20 | 21 | 22 | 23 | |
| | | | g feed/bird/30 minutes | | | | |
| 26 | F | 3 | 7.0 | 1.7 | 0 | 0.7 | |
| | M | 3 | 127.0 | 110.7 | 83.3 | 13.0 | |
| 69 | F | 3 | 12.3 | 9.0 | 1.0 | 0.3 | |
| | M | 3 | 76.7 | 57.3 | 33.0 | 20.3 | |
| 26 + 69 | F | 6 | 9.7 | 5.3 | 0.5 | 0.5 | $4.0^b$ |
| | M | 6 | 101.8 | 84.0 | 58.2 | 16.7 | $65.2^a$ |
| 26 | F + M | 6 | 67.0 | 56.2 | 41.7 | 6.7 | $42.9^a$ |
| 69 | F + M | 6 | 44.5 | 33.2 | 17.0 | 10.3 | $26.3^b$ |
| Height | | $\bar{X}$ | $55.8^a$ | $44.7^{ab}$ | $29.3^b$ | $8.6^c$ | |

Significant effects:
Age P ≤ .02
Sex P ≤ .0001
Age × Sex P ≤ .006
Height P ≤ .0002
Sex × Height p ≤ .003

EXAMPLE 4

Effect of height at an extended grill width. Broiler breeder males and females, 26 and 69 wk of age, were given access to a feeder fitted with a 6 inch grill lip extension at a height of 15 or 18 inches for a total distance of 21 or 24 inches, respectively. Each height was tested with three pens of 3 males or females within a period of 1 week. Birds were allowed access to the feeder for 30 minutes each day.

These data are shown in Table 4. Males consumed feed faster than females but this was not influenced by height or age. This suggests that the extended grill width excluded females and reduced male consumption rates such that little discrimination of height effect was possible. The tendency of females to perch on the extended grill lip complicated this experiment. Efforts were made to remove females from the grill as soon as possible.

TABLE 4

Effect of Feeder Height at an Extended Grill Width of 6 Inches on Feed Consumption Rate (Exp. 4)

| Age | Sex | N | Height (inches) | | $\bar{X}$ |
|---|---|---|---|---|---|
| | | | 15 | 18 | |
| | | | g/feed/bird/30 minutes | | |
| 26 | F | 3 | 0.7 | 0 | |
| 26 | M | 3 | 51.0 | 31.3 | |
| 69 | F | 3 | 0.7 | 0.3 | |
| 69 | M | 3 | 30.0 | 6.3 | |
| 26 + 69 | F | 6 | 0.7 | 0.2 | $.4^b$ |
| 26 + 69 | M | 6 | 40.5 | 18.8 | $29.7^a$ |

TABLE 4-continued

Effect of Feeder Height at an Extended Grill Width of 6 Inches on Feed Consumption Rate (Exp. 4)

| Age | Sex | N | Height (inches) | | $\bar{X}$ |
|---|---|---|---|---|---|
| | | | 15 | 18 | |
| | | | g/feed/bird/30 minutes | | |
| 26 | F + M | 6 | 25.9 | 15.7 | $20.8^a$ |
| 69 | F + M | 6 | 15.4 | 3.3 | $9.3^a$ |
| Height | | $\bar{X}$ | $20.6^a$ | $9.5^a$ | |

Significant effects:
Age P ≤ .10
Sex P ≤ .0004
Age × Sex P ≤ .09
Height P - NS

EXAMPLE 5

Relative effect of grill width versus grill height. A hanging feeder was fitted with a 3 inch grill and placed in one pen at a height of 16 inches. A second feeder was fitted with a 5 inch grill and placed in another pen at a height of 14 inches. The combined distance was 19 inches in both cases (height from floor plus width) Groups of three 70 wk old broiler breeder females were alternated among the pens for four days and allowed to feed for 30 minutes each day in their resident pen. Feed consumption was determined as previously described.

As shown in Table 5, grill width was more effective than grill height in preventing females from feeding. Again, females exhibited perching behavior which enabled them to obtain some feed. These birds were placed back on the floor immediately. It was apparent that the females did not have the ability to both jump and extend their necks to eat simultaneously. They could obtain feed only by perching. The males were able to stretch their legs and necks to obtain feed while remaining in a standing position.

TABLE 5

Relative Effect of Grill Width Versus Height (Exp. 5)

| Grill (inches) | | Days | | | | $\bar{X}$ |
|---|---|---|---|---|---|---|
| Width | Height | 1 | 2 | 3 | 4 | |
| 3 | 16 | 81 | 108 | 122 | $100^1$ | $102.8^b$ |
| 5 | 14 | 0 | 24 | 19 | 49 | $23.0^a$ |

$a,b$ Means with different superscripts are different (P ≤ .0001).
$^1$ g/feed/bird/30 minutes

EXAMPLE 6

Effect of extended grill width and grill height. An experiment was conducted to more clearly delineate height and width effects. A standard hanging tube feeder was fitted with a fabricated wire mesh such that the pan lip was extended to 2, 3, 4, and 5 inches. Broiler breeder males and females, 24 and 67 wk of age, were divided by sex and age into four groups and distributed among 20 pens. Each pen of three birds was randomly exposed to a feeder height of 15 or 18 inches in combination with a grill (extension of lip) of 1, 2, 3, 4, or 5 inches. The birds were allowed access to the feeder for 30 minutes per day. The feeder was secured to prevent swinging. The experiment was carried out during 10 days over a 2 wk period where all birds were allowed to feed in unmodified (1 inch lip) feeders during the weekend.

These data are shown in Table 6. Females consumed feed slower than males and young birds consumed feed faster than old birds. An age by sex interaction was apparently due to old males consuming feed slower than young males while old females consumed faster than young females in many cases. Feed consumption rate declined with increasing grill width but more slowly so in males since females were slower initially. Feed consumption was essentially stopped in females at a grill width of 5 inches. An age by grill interaction was due to young males being restricted less than old males as grill width increased, an apparent result of differences in vigor, while females showed less difference. Increasing grill height reduced feed consumption rate but less so for males than females, since males could simply stand and stretch to eat. Significant age×grill×height and sex×grill×height interactions demonstrate the combined effects of grill height and width relative to bird size and agility. Females that perched on the grills continued to be a problem which had to be eliminated in order for this design to be successful.

tainly require this amount of space or more. This required another design modification.

TABLE 7
Effect of an Additional Upper Grill at Various Spacing, Heights, and Grill Width (Exp. 7)

| Age | Sex | N | Space between grills inches | 4 inch grill at 18 inch height | 5 inch grill at 17 inch height |
|-----|-----|---|---|---|---|
|     |     |   |   | g feed/bird/30 minutes | |
| 27  | F   | 2 | 2.2 | 0 | 0 |
|     | F   | 2 | 3.6 | 0 | 0 |
|     | F   | 2 | 4.0 | 6.0 | 0 |
| 27  | M   | 2 | 2.2 | 87.0 | 79.5 |
|     | M   | 2 | 3.6 | 95.0 | 74.0 |
|     | M   | 2 | 4.0 | 85.0 | 69.0 |
| 70  | M   | 2 | 2.2 | 9.0 | 1.0 |
|     | M   | 2 | 3.6 | 32.5 | 30.5 |
|     | M   | 2 | 4.0 | 41.0 | 42.5 |

TABLE 6
Effect of Grill Width and Height on Broiler Breeder Feed Consumption (Exp. 6)

| Age | Sex | N | Height inches (cm) | 1(2.5) | 2(5.1) | 3(7.6) | 4(10.2) | 5(12.7) | Over all X |
|-----|-----|---|---|---|---|---|---|---|---|
|     |     |   |   | g feed/bird in 30 min | | | | | |
| 24  | F   | 5 | 15(38.1) | 41.4 | 49.8 | 15.4 | 14.2 | 2.6 | |
|     | F   | 5 | 18(45.7) | 15.0 | 8.4 | 2.4 | 0 | 0 | |
| 24  | M   | 5 | 15 | 103.2 | 110.8 | 91.0 | 89.4 | 96.2 | |
|     | M   | 5 | 18 | 118.4 | 90.8 | 77.2 | 92.8 | 60.2 | |
| 67  | F   | 5 | 15 | 67.0 | 41.2 | 56.4 | 21.6 | 1.4 | |
|     | F   | 5 | 18 | 28.4 | 22.2 | 1.6 | 1.0 | 0.4 | |
| 67  | M   | 5 | 15 | 83.4 | 63.8 | 84.2 | 59.4 | 41.2 | |
|     | M   | 5 | 18 | 70.2 | 69.2 | 59.2 | 49.4 | 29.0 | |
| 24  | M + F | 100 | 15 + 18 | | | | | | 54.0[a] |
| 67  | M + F | 100 | 15 + 18 | | | | | | 42.5[b] |
| 24+ | F   | 10 | 15 | 54.2 | 45.5 | 35.9 | 17.9 | 2.0 | |
| 67  | F   | 10 | 18 | 21.7 | 15.3 | 2.0 | 0.5 | 0.2 | |
| 24+ | M   | 10 | 15 | 93.3 | 87.3 | 87.6 | 74.4 | 68.7 | |
| 67  | M   | 10 | 18 | 94.3 | 80.0 | 68.2 | 71.1 | 44.6 | |
| 24+ | F   | 100 | 15 + 18 | | | | | | 19.5[b] |
| 67  | M   | 100 | 15 + 18 | | | | | | 77.0[a] |
|     | M + F | 100 | 15 | | | | | | 56.7[a] |
|     | M + F | 100 | 18 | | | | | | 39.8[b] |
| Grill | X | | | 65.9[a] | 57.0[ab] | 48.4[bc] | 41.0[c] | 28.9[d] | |

Significant effects:
Age  $P \leq .0001$
Sex  $P \leq .0001$
Age × Sex  $P \leq .0001$
Grill  $P \leq .0001$
Age × Grill  $P \leq .06$
Height  $P \leq .0001$
Sex × Height  $P \leq .03$
Age × Grill × Ht.  $P \leq .03$
Sex × Grill × Ht.  $P \leq .04$

EXAMPLE 7

Inclusion of an upper grill. An upper grill was fabricated to prevent birds from perching on the lower grill lip extension. Two pens of each sex of two ages, 27 and 70 wk, were allowed access to the feeders. The distance between the lower grill lip extension and upper grill was adjusted to 2.2, 3.6, or 4.0 inches. The grill widths were either 4 inches or 5 inches combined with a height of either 18 inches or 17 inches, respectively, for a combined total of 22 inches from floor to feed. Again, the total distance was based on the data of Experiment 1.

The addition of an upper grill prevented females from perching on the lower grill at intragrill distances of 3.6 inches or less (Table 7). At an intragrill distance of 4.0 inches, some females could insert themselves between the grills by precise jumping, and eat. Intragrill distances of 3.6 or 4.0 inches were necessary to allow dubbed males to eat. Non-dubbed males would cer-

EXAMPLE 8

Inclusion of vertical bars between two grills. vertical bars which were spaced every two inches were placed between the upper and lower grill with an intragrill distance of 4 inches (FIG. 5). The grill widths were 5 inches and lower grill height was 17 inches from the floor. Small groups of 28 wk old males and females and 71 wk old females were allowed to attempt feeding.

No feed was consumed by 28 wk old or 71 wk old females when exposed to the feeder for two 24 hour periods. The 28 wk old males consumed 66, 51, and 68 g per male per 30 min on 3 consecutive days. This demonstrates the total exclusion of females while allowing males to eat relatively freely. The use of vertical bars negates the need for intragrill distances of 3.6 inches or less, since females are totally excluded. Either dubbed or non-dubbed males can insert their heads and necks up to their chests if the two grills are sufficiently far apart.

The feeding apparatus of the present invention is the first known poultry feeding apparatus designed for allowing access of male birds to feed, while restricting access of female birds to the feed. Thus, more controlled feeding of broiler breeder flocks during the egg laying period is possible.

The foregoing examples are illustrative of the present invention, and are not to be construed as limiting thereof. The invention is defined by the following claims, with equivalents of the claims to be included therein.

That which is claimed is:

1. A male only grill and poultry feeder combination, comprising:
   a poultry feeder;
   first barrier means connected to said feeder and extending radially outward therefrom;
   second barrier means connected to said feeder and positioned above said first barrier means for blocking access to said feeder to birds perching on said first barrier means; and
   third barrier means connected to said feeder and positioned between said first and second barrier means, said third barrier means being configured so that a bird can insert its head therethrough toward said feeder, but is prevented from forcing its chest portion therethrough, and being spaced at a predetermined distance from said feeder so that access to said feeder is blocked for female birds, but male birds have access to said feeder.

2. An apparatus according to claim 1, wherein said feeder is a pan-type feeder.

3. An apparatus according to claim 1, wherein said feeder is a trough-type feeder.

4. An apparatus according to claim 1 wherein said first barrier means comprises a first grill portion connected to said poultry feeder, said second barrier means comprises a second grill portion connected to said poultry feeder, and said third barrier means comprises a third grill portion interconnected to said first and second grill portions.

5. An apparatus according to claim 1 wherein said first barrier means and said second barrier means are substantially parallel.

6. An apparatus according to claim 1 wherein said first barrier means includes a flat bottom wall surface, and said second barrier means includes a top wall surface.

7. A male only poultry feeder comprising:
   an enclosed chamber having a top cover, a side wall, and a bottom portion, said enclosed chamber side wall spaced apart from said poultry feeder from about two to six inches; and
   at least one opening formed in said enclosed chamber side wall, said opening having a vertical opening distance of at least about three inches and a horizontal opening distance of about two inches so that a bird can insert its head therethrough toward said feeder, but is prevented from forcing its chest portion therethrough, and being spaced at a predetermined distance from said feeder so that access to said feeder is blocked for female birds, but male birds have access to said feeder.

8. An apparatus according to claim 7 wherein said top cover is conically configured.

9. An apparatus according to claim 7 wherein said at least one opening formed in the enclosed chamber wall is inclined.

10. A male only grill and poultry feeder combination, comprising:
    a poultry feeder positioned a first distance above a ground surface;
    first barrier means connected to said feeder and extending radially outward therefrom;
    second barrier means connected to said feeder and positioned above said first barrier means for blocking access to said feeder to birds perching on said first barrier means;
    third barrier means connected to said feeder and positioned between said first and second barrier means, said third barrier means being configured so that a bird can insert its head therethrough toward said feeder, but is prevented from forcing its chest portion therethrough, and being spaced at a second distance from said feeder;
    wherein said first distance and said second distance are selected so that access to said feeder is blocked for female birds, but male birds have access to said feeder.

11. A male-only grill and poultry feeder combination according to claim 10, wherein the sum of said first distance and said second distance is between about 21 and 24 inches.

12. A male-only grill and poultry feeder combination according to claim 10, wherein said first distance is between about 15 and 18 inches.

* * * * *